US008213363B2

(12) United States Patent
Ying et al.

(10) Patent No.: US 8,213,363 B2
(45) Date of Patent: **\*Jul. 3, 2012**

(54) QOS CHANNELS FOR MULTIMEDIA SERVICES ON A GENERAL PURPOSE OPERATING SYSTEM PLATFORM USING DATA CARDS

(75) Inventors: Wen-Ping Ying, Bellevue, WA (US); Don Hjort, Issaquah, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 45 days.

This patent is subject to a terminal disclaimer.

(21) Appl. No.: 12/567,236

(22) Filed: Sep. 25, 2009

(65) Prior Publication Data

US 2010/0017521 A1    Jan. 21, 2010

Related U.S. Application Data

(63) Continuation of application No. 11/182,699, filed on Jul. 15, 2005, now Pat. No. 7,609,700.

(60) Provisional application No. 60/660,957, filed on Mar. 11, 2005.

(51) Int. Cl.
*H04W 4/00* (2009.01)
*H04L 12/28* (2006.01)
*G06F 15/16* (2006.01)

(52) U.S. Cl. ............... 370/328; 370/395.21; 370/260; 370/252; 709/227

(58) Field of Classification Search .............. 370/395.21, 370/260, 252, 329, 332–333, 338, 395.2, 370/229–230, 328, 342–343, 401, 351–352; 709/227, 233, 238, 220; 726/3; 455/556.2, 455/557

See application file for complete search history.

(56) References Cited

U.S. PATENT DOCUMENTS

| 6,366,577 | B1 | 4/2002 | Donovan |
| H2051 | H | 11/2002 | Zhu et al. |
| 6,519,643 | B1 * | 2/2003 | Foulkes et al. ............... 709/227 |
| 6,631,122 | B1 | 10/2003 | Arunachanam et al. |
| 6,640,248 | B1 | 10/2003 | Jorgenson |
| 6,775,553 | B1 * | 8/2004 | Lioy ............................ 455/461 |
| 6,788,676 | B2 | 9/2004 | Partanen et al. |
| 6,847,610 | B1 * | 1/2005 | Suumaki et al. ........... 370/230.1 |
| 6,862,622 | B2 | 3/2005 | Jorgenson |
| 6,901,079 | B1 | 5/2005 | Phadnis et al. |
| 6,965,948 | B1 | 11/2005 | Eneborg et al. |
| 6,970,452 | B2 | 11/2005 | Kim et al. |
| 6,970,930 | B1 | 11/2005 | Donovan |

(Continued)

OTHER PUBLICATIONS

Notice of Allowance dated Jun. 25, 2009 for U.S. Appl. No. 11/182,699, 36 pages.

(Continued)

*Primary Examiner* — Kwang B Yao
*Assistant Examiner* — Candal Elpenord
(74) *Attorney, Agent, or Firm* — Turocy & Watson, LLP

(57) ABSTRACT

A SIP (session initiation protocol) service activation abstraction layer that provides a unified interface to upper layer applications for discovering, establishing, and managing the QoS connectivity. In one implementation, this is IP Multimedia Subsystem-centric, further supporting applications that utilize SIP for session control. This capability extends to the data card universe allowing UMTS data card vendors to establish concurrent QoS-based sessions using multiple primary PDP (packet data protocol) contexts based on a set of SIP triggers, further allowing applications running on a computing system to transparently utilize the established pipes based on the individual QoS requirements.

19 Claims, 12 Drawing Sheets

U.S. PATENT DOCUMENTS

| | | | |
|---|---|---|---|
| 6,987,985 B2 | 1/2006 | Purkayastha et al. | |
| 7,082,307 B2 * | 7/2006 | Zhou et al. | 455/445 |
| 7,085,570 B2 * | 8/2006 | Tigerstedt et al. | 455/439 |
| 7,221,945 B2 | 5/2007 | Milford et al. | |
| 7,330,448 B2 | 2/2008 | Verma et al. | |
| 7,356,609 B1 * | 4/2008 | Allam et al. | 709/238 |
| 7,362,776 B2 * | 4/2008 | Meier et al. | 370/468 |
| 7,724,700 B1 * | 5/2010 | Grayson et al. | 370/328 |
| 2002/0131395 A1 | 9/2002 | Wang | |
| 2003/0079020 A1 * | 4/2003 | Gourraud et al. | 709/227 |
| 2003/0087649 A1 | 5/2003 | Bhatia et al. | |
| 2003/0117954 A1 | 6/2003 | De Neve et al. | |
| 2003/0204599 A1 | 10/2003 | Trossen et al. | |
| 2004/0064555 A1 * | 4/2004 | Cuny et al. | 709/225 |
| 2004/0068539 A1 | 4/2004 | Lai et al. | |
| 2004/0107238 A1 | 6/2004 | Orton et al. | |
| 2004/0147262 A1 * | 7/2004 | Lescuyer et al. | 455/434 |
| 2004/0162105 A1 | 8/2004 | Reddy et al. | |
| 2004/0176075 A1 * | 9/2004 | Schwarz et al. | 455/414.1 |
| 2004/0218607 A1 * | 11/2004 | Hurtta et al. | 370/395.21 |
| 2004/0223602 A1 | 11/2004 | Honkasalo et al. | |
| 2004/0249951 A1 | 12/2004 | Grabelsky et al. | |
| 2005/0073997 A1 | 4/2005 | Riley et al. | |
| 2005/0117586 A1 | 6/2005 | Ikeda et al. | |
| 2005/0128963 A1 | 6/2005 | Gazda et al. | |
| 2005/0141541 A1 * | 6/2005 | Cuny et al. | 370/437 |
| 2006/0149845 A1 * | 7/2006 | Malin et al. | 709/228 |

OTHER PUBLICATIONS

Office Action dated Dec. 16, 2008 for U.S. Appl. No. 11/182,699, 58 pages.

Office Action dated May 29, 2008 for U.S. Appl. No. 11/182,699, 47 pages.

* cited by examiner

QOS CHANNELS FOR MULTIMEDIA SERVICES ON A GENERAL PURPOSE OPERATING SYSTEM PLATFORM USING DATA CARDS

CROSS-REFERENCE TO RELATED APPLICATIONS

This is a continuation application under 35 USC 120 of U.S. patent application Ser. No. 11/182,699, filed Jul. 15, 2005, entitled "QoS CHANNELS FOR MULTIMEDIA SERVICES ON A GENERAL PURPOSE OPERATING SYSTEM PLATFORM USING UMTS DATA CARDS," pending, and assigned to the assignee hereof. This application also claims the benefit of U.S. Provisional Patent Application Ser. No. 60/660,957 entitled "QoS CHANNELS FOR MULTIMEDIA SERVICES ON A GENERAL PURPOSE OPERATING SYSTEM PLATFORM USING UMTS DATA CARDS" and filed Mar. 11, 2005, the entirety of both applications are incorporated by reference herein.

TECHNICAL FIELD

This invention is related to application interfaces, and more specifically, to an interface that facilitates QoS (Quality-of-service) communications over a multimedia network.

BACKGROUND

The advent of global communications networks such as the Internet and rapid advance in cellular communications are converging to meld both environments. Thus, cellular users can access IP networks (or packet networks) and all the services provided therein. SIP (session initiation protocol) is a signaling protocol used for establishing sessions in an IP packet network. A session could be a simple two-way telephone call or it could be a collaborative multi-media conference session.

GPRS (General Packet Radio Service) and UMTS (Universal Mobile Telecommunications System) standards provide a way of establishing data connectivity between mobile devices, according to one standard termed ME/UE (mobile equipment/user equipment), and packet networks using a PDP (packet data protocol) context activation procedure. As part of the negotiation, a certain level of QoS (quality-of-service) can be negotiated for the connection being configured. UMTS network services have different QoS classes for at least four types of traffic, including a conversational class (e.g., voice, video telephony, video gaming), a streaming class (e.g., multimedia, video on demand, webcast), interactive class (e.g., web browsing, network gaming, database access), and background class (e.g., email, SMS-short message service, downloading).

For a GPRS network, the allowed QoS is usually pre-provisioned in the HLR (home location register) on a per-subscription basis and is fixed, since there is limited QoS support available. The HLR is the database within a GSM (Global System for Mobile Communications) network which stores all the subscriber data.

Contrariwise, UMTS supports various types of connectivity with different levels of QoS flow specifications. Negotiation of different QoS channels involves either establishing a new PDP context or by modifying the current context. Due to limitations in usability and practicality, modification of the existing context and its associated QoS is seldom done. Instead, the UE will negotiate a new context each time a new QoS is required. The standards provide an efficient way of allowing the UE to configure connectivity with the required QoS support. This is done via a secondary PDP context activation procedure.

For UE running on an embedded platform, such as a handset, the mechanism of establishing new PDP context based on the needs from an application is highly integrated, and can be done seamlessly, since both the underlying stack and the applications run on the same platform. This is more difficult for UE in a PC card form factor, since the stack and the applications run on two heterogeneous platforms. Due to this limitation, the PC (personal computer, or more generally, computing device) can only set up one PDP context (a primary context) either by using a generic point-to-point connection (e.g., dial-up networking (DUN)) via a virtual modem port, or one LAN-like interface via a network interface. Currently there is only one connection type possible for all applications running on the PC, thus preventing applications from using multimedia services (e.g., IMS-IP multimedia subsystem). All applications will then need to use the same QoS that is associated with that single context. This prohibits the UMTS PC card users from obtaining concurrent multi-QoS support tailored to different applications.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

With the availability of HSDPA (high speed downlink packet access) and IMS (IP Multimedia Subsystem, also referred to as an IP Multimedia Domain), great revenue opportunity exists by providing content providers/application developers the capability to create services/applications that take advantage of the higher data rates and multimedia QoS (quality-of-service)-enabled networks. HSDPA is a packet-based data service in the WCDMA (wideband CDMA) downlink with data transmission up to 8-10 Mbps (and 20 Mbps for MIMO systems) over a 5 MHz bandwidth in WCDMA downlink. HSDPA implementations include adaptive modulation and coding (AMC), multiple-input multiple-output (MIMO), hybrid automatic request (HARQ), fast cell search, and advanced receiver design.

In support of extending this capability to the PC card (also known as a data card or e.g., a 3G UMTS PC Card) universe, disclosed herein is a unified interface and mechanism that supports upper layer applications for discovering, establishing, and managing the QoS connectivity. Concurrent multi-media sessions each with different QoS support and background IP data traffic can now be realized. Since this can be applied to the IMS, the invention also supports applications utilizing SIP (session initiation protocol) for session control.

The novel architecture allows PC card (e.g., UMTS) vendors to establish concurrent QoS-based sessions using multiple primary PDP (packet data protocol) contexts based on a set of SIP triggers, and allows applications running on a PC platform to transparently utilize the established pipes based on the individual QoS requirements.

In furtherance thereof, the invention disclosed and claimed herein, in one aspect thereof, comprises a system that facilitates communication with a multimedia network. The system comprises a communications component of a computing system that facilitates communications with a multimedia network, and an applications component of the computing system that provides a unified interface across disparate applications for at least one of discovering, establishing, and managing QoS connectivity to the multimedia network for the applications via the communications component.

In another aspect thereof, a uniform abstraction layer is provided that facilitates the following: a way for the applications to discover the interface, which is associated with the PDP context established for the required QoS; a way to discover ISIM (IMS subscriber identity module) profiles, including P-CSCF (proxy-call session control function), public and private Identity, etc.; and, a way to perform admission control and the management of PDP context (QoS connections). This is done via the introduction of a SIP service activation (SSA) layer and a service access point (SAP). The SSA acts as a local user agent server (UAS) only for the duration of initial SIP proxy discovery process. The SSA can use a fixed well-known local IP address, for example, 127.0.0.1, and port 5060 (or any other well-known address and port registered with IANA-Internet Assigned Numbers Authority) and performs the following functions: SIP registration, SIP redirect UAS, ISIM profile, S-PDP (streaming-PDP) connection management, and admission control.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
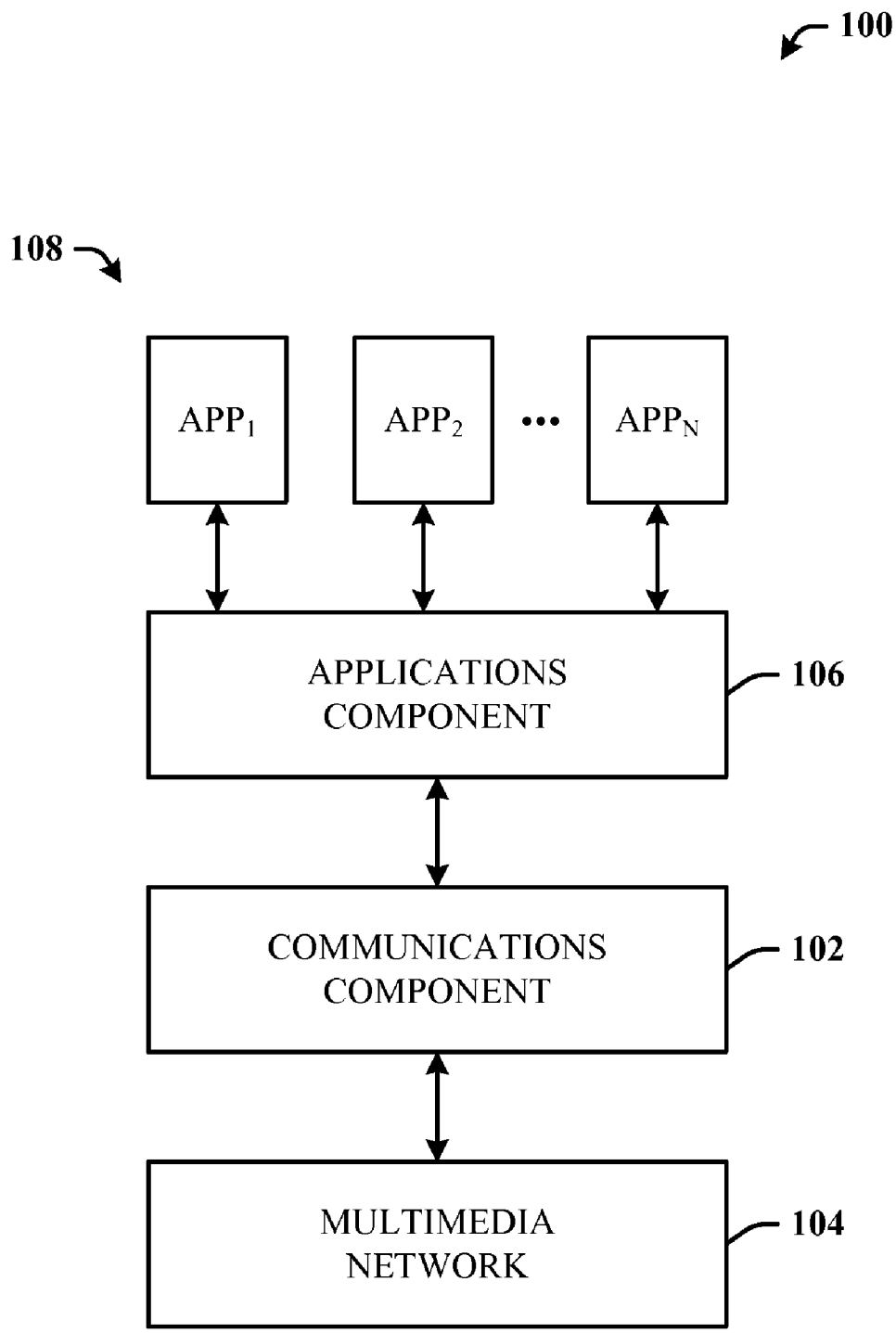
FIG. 1 illustrates a system that facilitates session-independent QoS channels for multimedia services in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring initially to the drawings, FIG. 1 illustrates a system 100 that facilitates session-independent QoS (quality-of-service) channels for multimedia services in accordance with the subject invention. The system 100 comprises a communications component 102 (e.g., a network interface card) that facilitates communications with a multimedia network 104 (e.g., an IMS-IP multimedia subsystem network). In a computing system (e.g., a portable or desktop system), the communications component 102 can be a network interface card such as that associated with a PC card form factor (e.g., a network interface card, a UMTS PC Card, an EDGE PC Card, a GPRS PC Card, etc.). Such a card can also be a data card, and in one implementation, a UMTS (Universal Mobile Telecommunications System) data card. Principal aspects of the subject invention are embodied in an applications component 106 of the computing system to provide a unified interface across one or more resident applications 108 (e.g., disparate applications) denoted $APP_1, APP_2, \ldots, APP_N$. The applications component 106 facilitates at least one of discovering, establishing, and managing QoS connectivity to the multimedia network 104 for the applications 108 via the communications component 106.

The applications component 106 can be provided as a SIP (session initiation protocol) service activation abstraction layer that provides the unified interface to the upper layer applications 108. Such protocol details can be found in RFC 3261: Session Initiation Protocol, the entirety of which incorporated by reference herein. In one implementation, this is IMS-centric, further supporting applications that utilize SIP for session control. This capability extends to the data card universe allowing UMTS data card vendors to establish concurrent QoS-based sessions using multiple primary PDP (packet data protocol) contexts based on a set of SIP triggers. This further allows the applications 108 running on the computing system to transparently utilize the established data pipes based on the individual QoS requirements.

Figure 2:
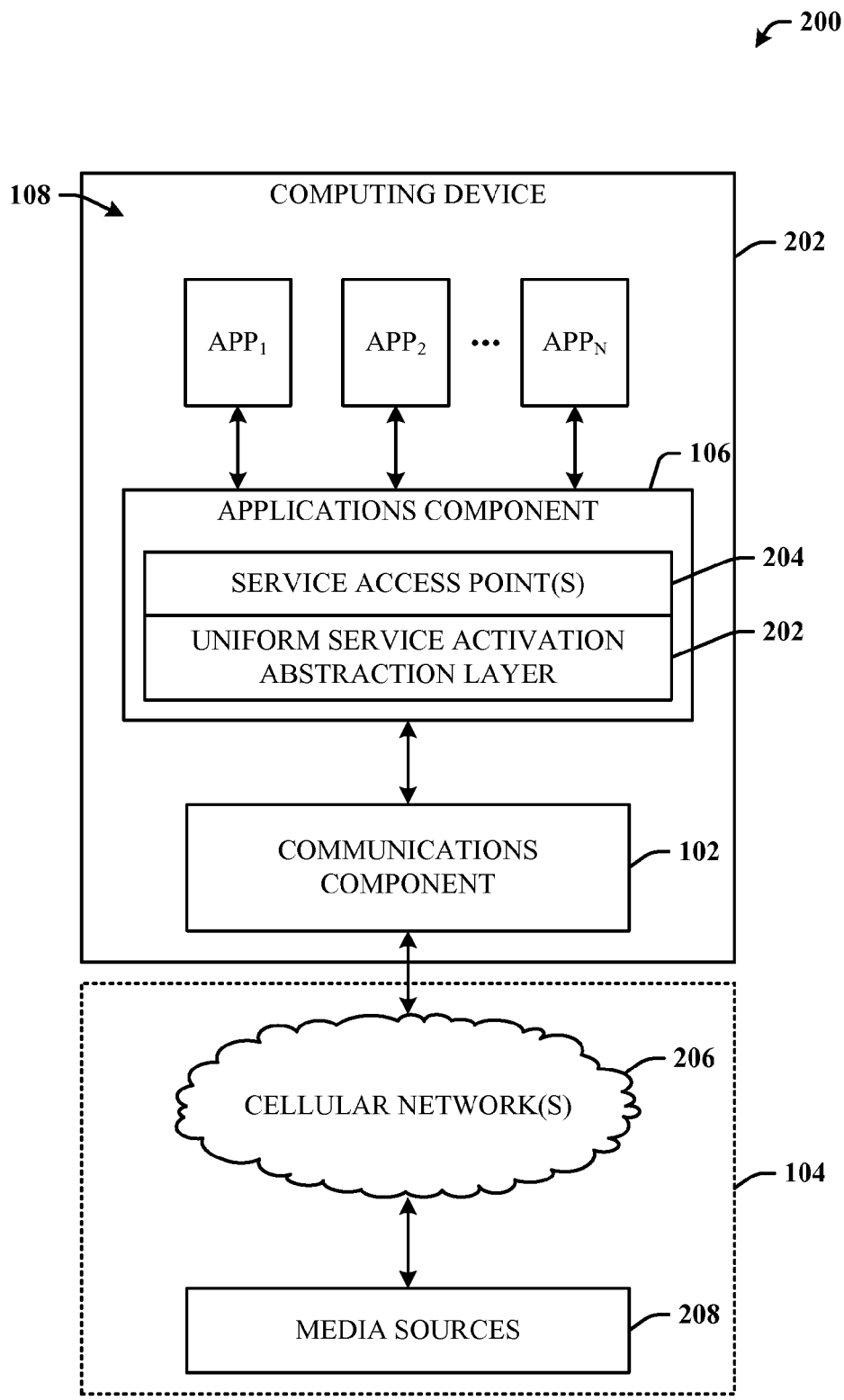
FIG. 2 illustrates a diagram of a system that employs a computing device which employs the QoS architecture of the disclosed innovation.

FIG. 2 illustrates a diagram of a system 200 that employs a computing device 202 which employs the QoS architecture of the disclosed innovation. The device 202 includes the one or more applications 108 any one or more of which can request access to an external network. The applications component 106 includes a uniform service activation abstraction layer 202 (e.g., SIP) which interfaces to one or more service access points (SAPs) 204. The applications 108 interact with the layer 202 via the SAPs 204. The applications component 106 interfaces to the communications component 102 (e.g., a PC card), which further facilitates interfacing to the multimedia network 104. In this embodiment, the multimedia network 104 can include a cellular network 206 (e.g., UMTS or UTRAN-UMTS terrestrial radio access network) and a media sources component 208. It is to be appreciated that the cellular network 206 can also include satellite-based communications. The media sources component 208 includes any type of media source such as radio, television, digital satellite radio and television, analog and digital sources, and multimedia, for example.

In operation, the service activation layer functions as a local user agent server (UAS) for the duration of an initial proxy discovery process (e.g., SIP process). In one example, the UAS utilizes a fixed well-known local IP address (e.g., 127.0.0.1), and port number (e.g., 5060), or any address and port registered with IANA), and performs registration, redirection, profile discovery, streaming connection management, and admission control.

An application (e.g., $APP_1$) sends an invite message (e.g., a SIP Invite) to via an SAP 204 to the service activation layer 202. The layer 202 checks if the communications component 102 (e.g., UE) is registered with the computing device 202. If not, the layer automatically registers the communications component 102. The layer then checks if the context (or QoS link) has been established. If not, the layer 202 initiates a context activation process, and creates an associated network interface via the communications component 102. If the link is already established, the layer 202 performs proper admission control to check if the resource associated with the link has been exhausted by other applications 108. Accordingly, if exhausted, the layer 202 sends a redirect message; otherwise, a reject message.

If admission is allowed and the context has been activated, the layer 202 composes a redirect message and sends it to the application (e.g., $APP_1$). The redirect message can include profile information such as the identity of a proxy CSCF (P-CSCF) (which is the first point of contact in a visited network and will find the user's home network and provide some translation, security and authorization functions), other relevant ISIM (IMS subscriber identity module) information, and the IP address (network interface) of the context to which the layer 202 should use in sending subsequent packets.

Once the redirect message is received, the application can proceed with a new invite message destined to the true proxy server on the network and flow will continue without the involvement of service activation layer 202. When the application ends the current session, the layer 202 can be informed of the availability of the resource so that the layer 202 is allowed to perform proper admission control for the subsequent new session requests.

Figure 3:
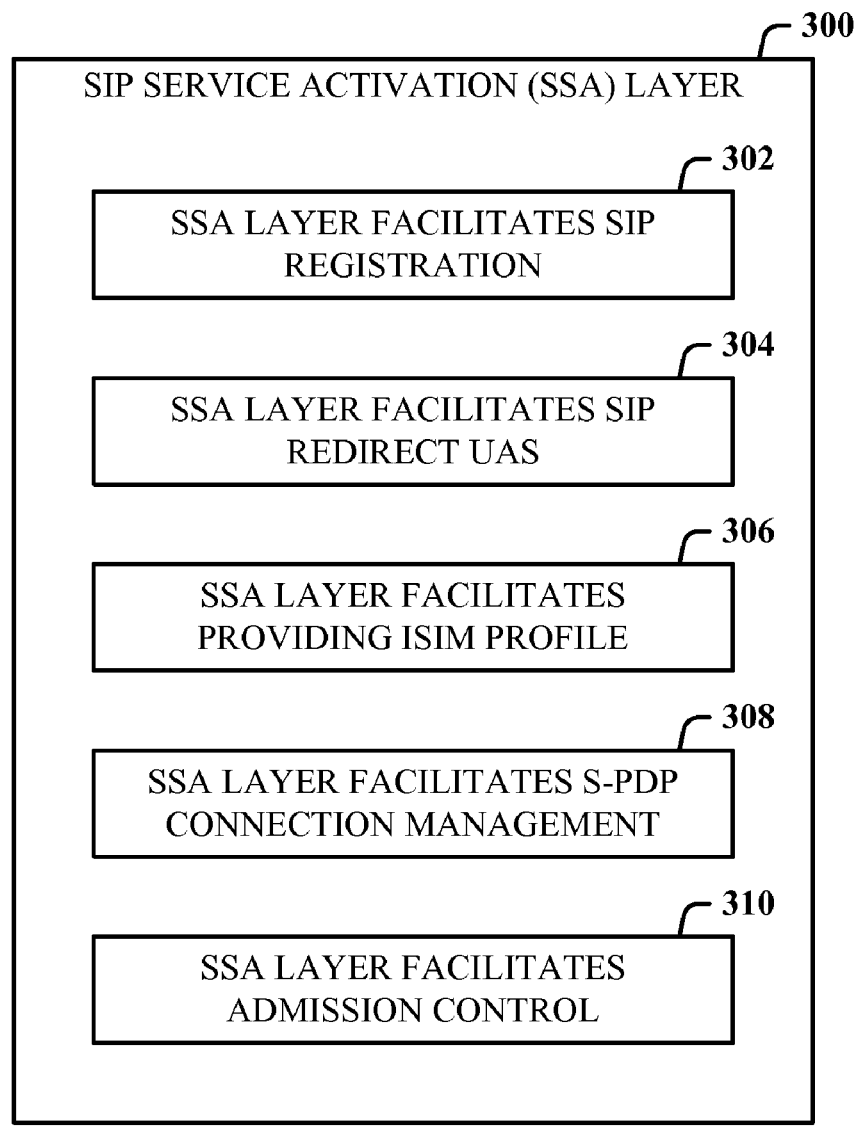
FIG. 3 illustrates a diagram of features provided by a disclosed SIP service activation (SSA) layer.

FIG. 3 illustrates a diagram of features provided by a disclosed SIP service activation (SSA) layer 300. The SSA 300 includes the capability to facilitate SIP registration 302. If the SSA 300 detects that the UE (user equipment) is not registered, it will perform registration on behalf of the UE. The SSA 300 also facilitates SIP redirection 304 as a UAS. If a resource previously associated with a context is available, the SSA 300 sends a SIP redirect message that connects the resource to a next application.

The SSA 300 also facilitates providing ISIM profile information. The SSA 300 includes this information in the redirect message for receipt by the application. The SSA 300 facilitates streaming PDP (S-PDP) connection management 308, and also admission control 310 by checking for links that have been exhausted by applications.

Figure 4:
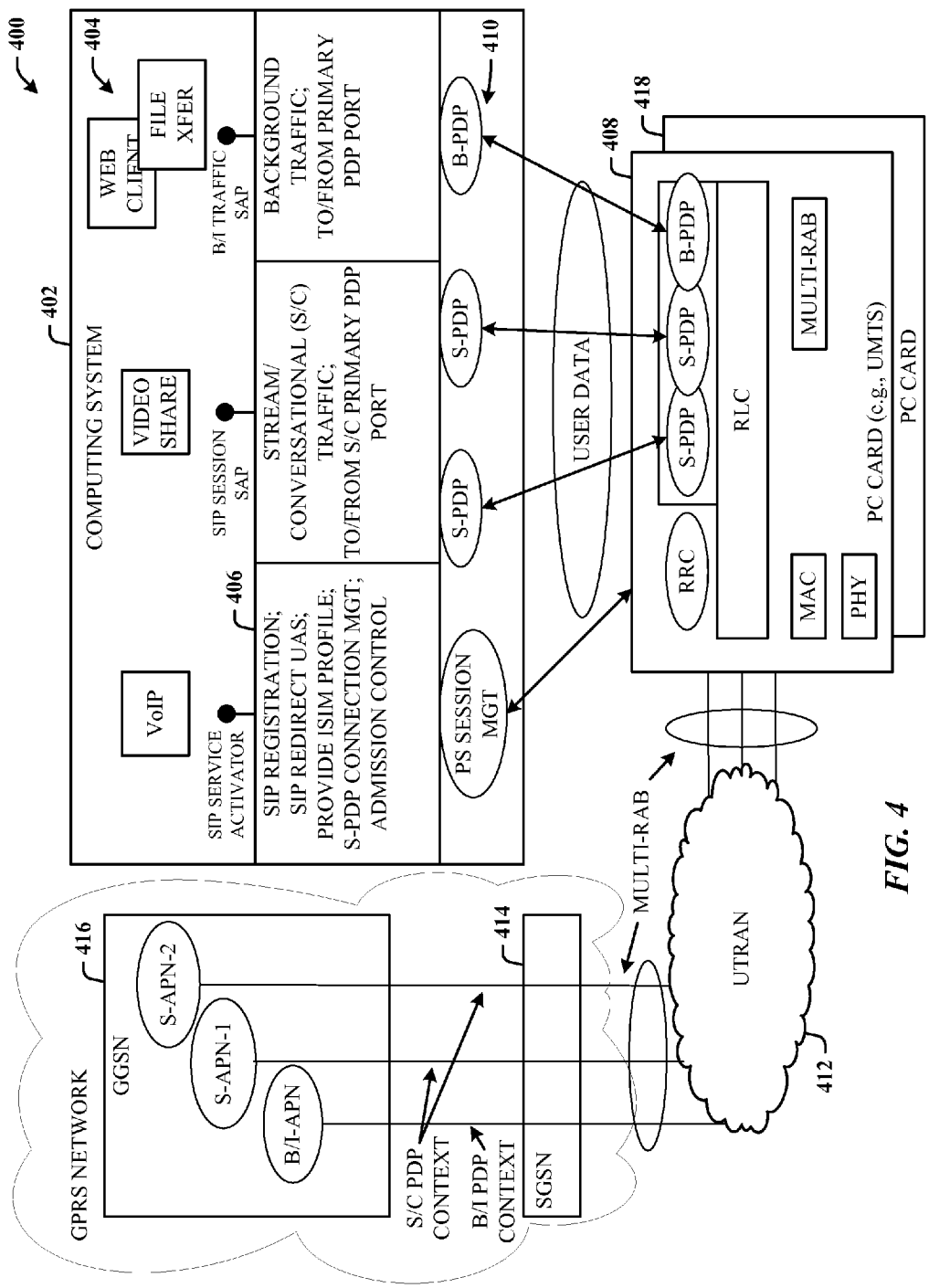
FIG. 4 illustrates a more detailed diagram of a system that employs the novel SSA architecture of the subject invention.

Referring now to FIG. 4, there is illustrated a more detailed diagram of a system 400 that employs the novel SSA architecture. The system 400 includes a computing system 402 which can utilize one or more PC cards to facilitate communications with a cellular network and to maintain QoS over independent channels for the communications of multimedia services via the cellular network. The computing system 402 can include a number of applications 404 that reside thereon for various uses. Here, the illustrated applications 404 are related to VoIP (Voice over IP), video sharing, a web client, and file transfer. The computing system 402 includes an SSA layer 406 that provides the unified interface and mechanism for the upper layer applications 404 to discover, establish, and manage QoS connectivity to multimedia services via a UE 408 (e.g., UMTS data card).

As indicated supra, the SSA is the uniform abstraction layer that facilitates the following: a way for the applications to discover the interface, which is associated with the PDP context established for the required QoS; a way to discover the ISIM profiles, including proxy CSCF, public and private Identity, etc.; and, a way to perform admission control and the management of PDP context (QoS connections). This is done via the introduction of a SIP Service Activation (SSA) layer and a Service Access Point (SAP). The SSA acts as a local User Agent Server (UAS) only for the duration of initial SIP proxy discovery process. The SSA can use a fixed well-known local IP address, e.g., 127.0.0.1, and port 5060 (or any other well-known address and port registered with IANA-Internet Assigned Numbers Authority) and performs the following functions: SIP Registration, SIP Redirect UAS, ISIM profile, S-PDP connection management, and Admission Control.

As indicated supra, the SSA 406 facilitates SIP registration, SIP Redirect messaging via the UAS, providing an ISIM profile, S-PDP connection management, and admission control.

The SSA 406 facilitates SIP Session SAPs (service access points) for video applications. For example, such video application can include streaming images (e.g., video) and/or conversational (S/C) data traffic, to and from the S/C primary PDP port. For more legacy applications (e.g., a web client and/or file transfer), the SSA 406 facilitates background/interactive (B/I) SAPs that process B/I traffic, to and from a primary PDP port. Accordingly, there are illustrated multiple sessions 410 (e.g., two S-PDP contexts and a single B-PDP (Background-PDP) context) which can occur substantially concurrently.

In the UE 408, the contexts 410 are received across the user data plane, established and processed by a RLC (radio link control) layer, which is a sublayer of the radio interface that provides reliability. The PS session management is passed across the control plane to the UE 408. Note that RLC can vary depending on the communication system employed. As indicated, the UE 408 includes multi-RAB (radio access bearer) capability. RAB is used in UMTS to identify a service which provides for the transfer of user data between the UE and the core network.

In a more robust implementation, it is within contemplation of the instant invention that multiple UE data cards can be employed. Thus, the SSA can facilitate selecting and managing contexts and sessions for the first card 408, and a second card 418.

Thus, data of the multiple concurrent sessions is processed and communicated from the UE 408 across a UTRAN 412. UTRAN is a conceptual term which identifies a part of the UMTS network which consists of one or more RNCs (radio network controllers) and one or more Node B's between Iu and Uu interfaces. From the UTRAN 412, the session data is communicated to an SGSN (serving GPRS support node) 414, and then to a GGSN (gateway GPRS support node) 416.

In the GPRS/UMTS packet service paradigm, the standards provide a mechanism to allow the establishment of a differentiated transport between the UE and the GGSN. The GGSN is the interface between the GPRS wireless data network and other networks, such as the Internet or private networks. This is accomplished via the PDP context activation process based on APNs (access point names). The QoS can be extended beyond the GPRS network to include the remainder of the end-to-end transport, as long as the leg between the GGSN 416, designated by the APN used and the terminating endpoint, supports the required QoS.

When concurrent streams with different QoS requirements are needed, UMTS provides a way to allow UE multiplexing sessions using pre-defined/supported multi-RAB. In order to provide end-to-end exposure, both to the UMTS gateway (e.g., GGSN) and to the PC, separate primary PDP contexts can be used, with distinct IP addresses available to separate traffic belonging to different sessions using different IP addresses. (Although ports can also be used for this purpose, for simplicity, it can be assumed that different IPs are used.) Over the UMTS network, these sessions are carried over the same RRC (radio resource control) connection established using the multi-RAB suitable to support the aggregated sessions. RRC is a sublayer of Layer 3 on the UMTS radio interface that exists in the control plane only, and provides information transfer service to the NAS (network access server). RRC is responsible for controlling the configuration of UMTS radio interface Layers 1 and 2.

Here, there are three contexts illustrated. A background application (e.g., a file transfer) initiates access to an external media source (not shown). The background application sends a SIP Invite message to the SSA 406, and the SSA 406 checks that the PC card (or UE) has been registered with a SIP registrar (or SIP proxy) of the computing system 402. A registrar is a server that accepts Register requests and places the information it receives in those requests into the location service for the domain it handles. As indicated supra, if the card 408 is not registered, the SSA 406 performs the registration process on behalf of the card 408.

The SSA 406 then checks to ensure that a context has been established to the card 408. If not, the SSA 406 establishes a session between the B-PDP session at 410 to the B-PDP entity of the card 408. This session is assigned a unique IP address and/or port number. If other applications are or have used the resource, the background application has to be admitted before using the resource. Once other application(s) have completed data transfer, the resource can be released for use by the background application. Once released, the admission can be allowed, and the PDP session activated for the background application. The SSA then notifies the background application of the profile information necessary to make the connection. This is provided in the SIP Redirect message, which can include the P-CSCF, other relevant ISIM data, and the IP address of the context (B-PDP) that the background application should use. The background application then uses a new SIP invite message to reach outside to the true SIP proxy server (not shown) on the network after which SIP and RTP packets from the application can flow without involvement of the SSA 406. Thus, the context now extends from the background application through the B/I traffic SAP, the B-PDP context session to the B-PDP session of PC card 408, and out to the cellular network 412 (e.g., UTRAN) through the SGSN 414 to the B/I APN entity of the GGSN 416. Thereafter, the session extends to the media source (not shown).

Similarly, depicted are two additional streaming application S-PDP sessions. These contexts are setup in a similar fashion as the background application session. Ultimately, one streaming or conversation application session (S-PDP to S-PDP of the card 408) is established through the UTRAN network to the S-APN-1 entity of the GGSN 416 of the GPRS network. The second streaming or conversation application session (S-PDP to S-PDP of the card 408) is established through the UTRAN network to the S-APN-2 entity of the GGSN 416 of the GPRS network.

Traditionally, a PDP context of a GPRS/UMTS data card is established when a network interface is created via the PC data card. This is accomplished either by using a dial-up connection via a virtual serial interface, or a more modern mechanism, via LAN-like network interface. In the latter case, either a dial-up connection (e.g., PPP) is used, but is transparent to the OS (operating system) and is established by the driver, or it is removed completely. In either case, the network interface is the only data pipe from the PC to the card, and then to the network. One IP address is also associated with the interface, which is assigned by the network when the primary PDP context is activated.

Figure 5:
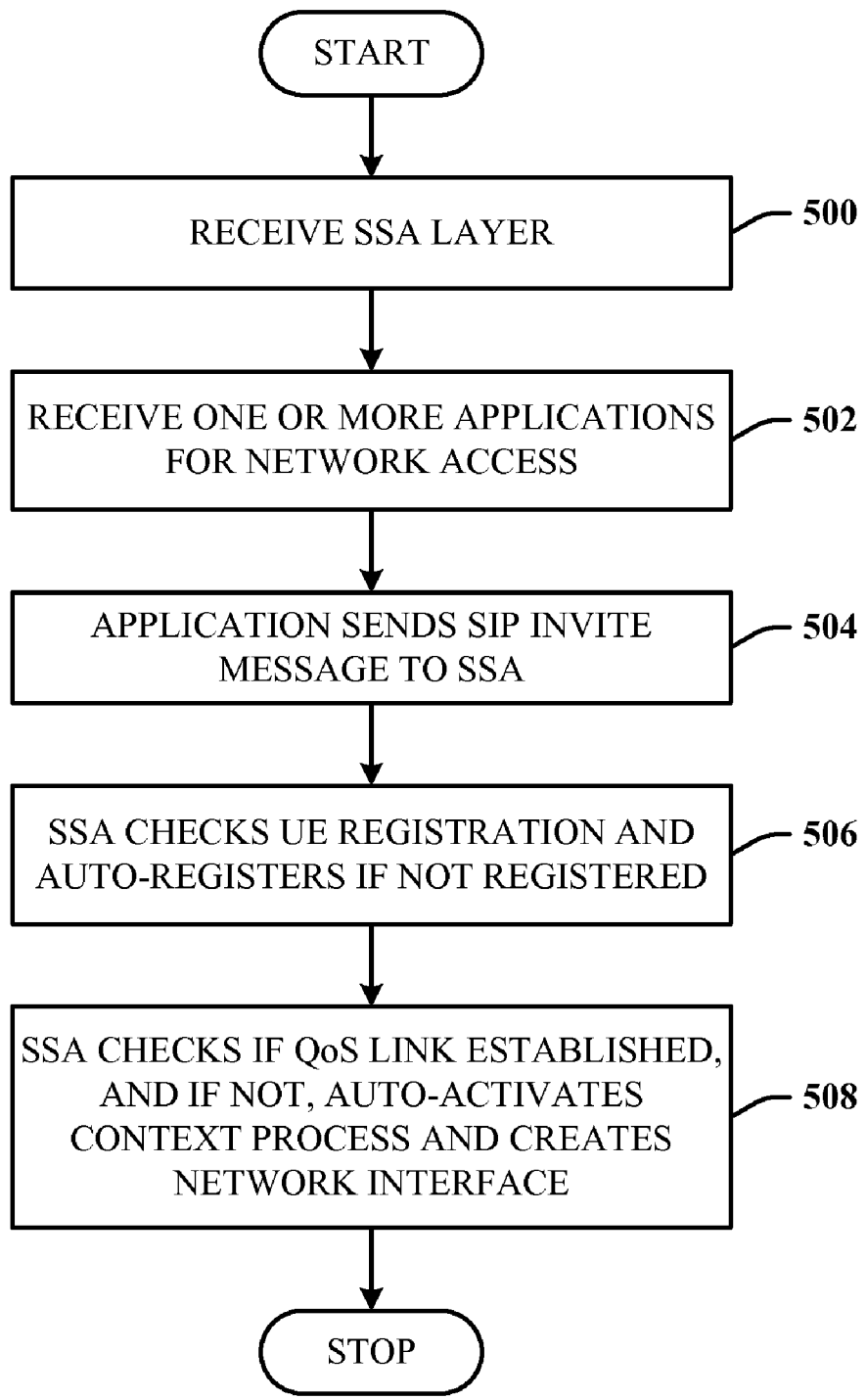
FIG. 5 illustrates a methodology of discovering a network interface associated with the context established for the QoS.

FIG. 5 illustrates a methodology of discovering a network interface associated with the context established for the QoS. While, for purposes of simplicity of explanation, the one or more methodologies shown herein, for example, in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 500, the SSA layer architecture is received. At 502, one or more applications are available on the computer for accessing network services and data. At 504, an application sends a SIP invite message to the SSA. At 506, the SSA checks UE registration and auto-registers the UE if it is not already registered. At 508, the SSA checks if the QoS link (primary PDP context) is established, and if not, automatically activates the context process to create a network interfaces and associated distinct IP address assigned by the network.

Figure 6:
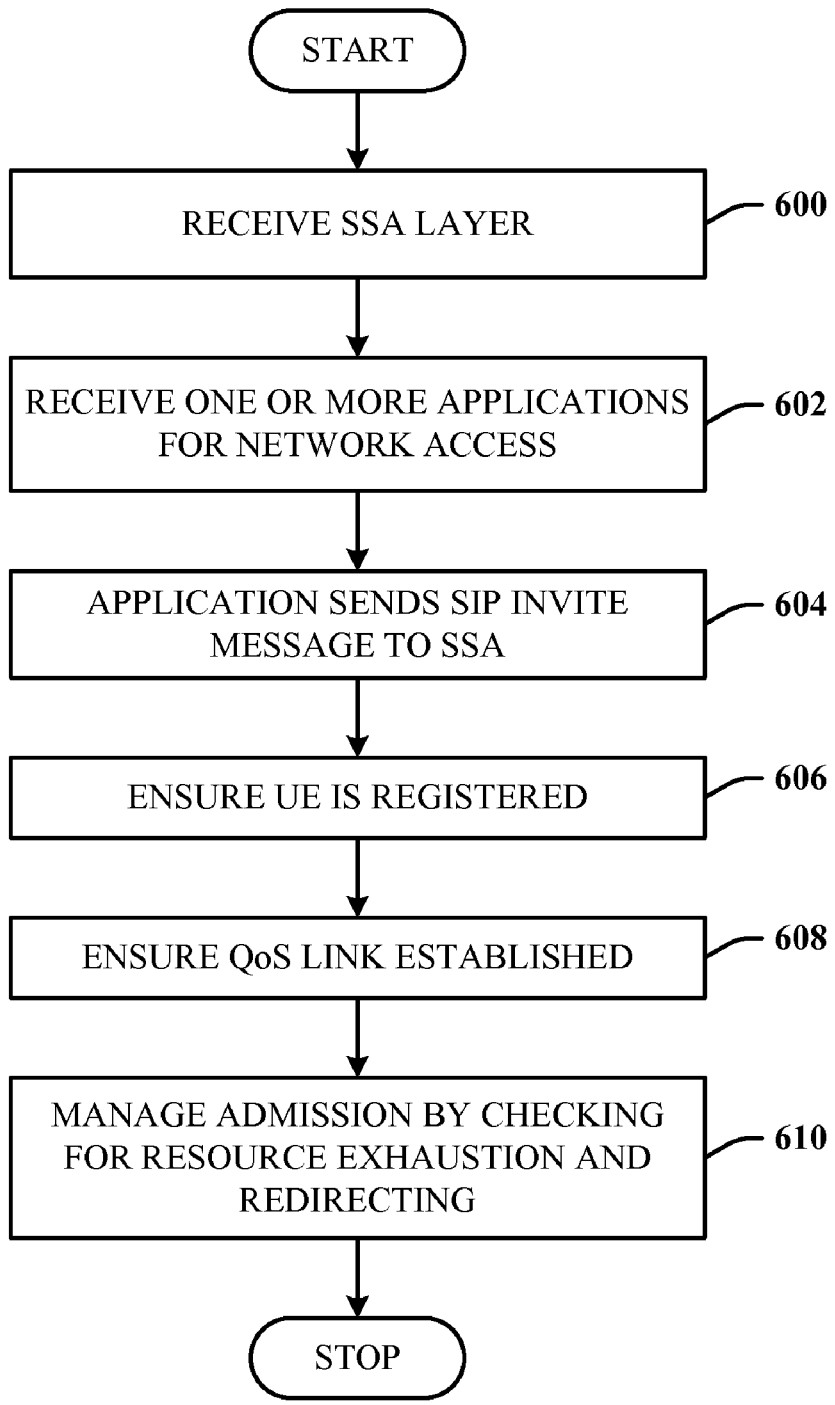
FIG. 6 illustrates a methodology of performing admission control and context management.

FIG. 6 illustrates a methodology of performing admission control and context management. At 600, the SSA layer architecture is received. At 602, one or more applications are available on the computer for accessing network services and data. At 604, an application sends a SIP invite message to the SSA. At 606, the SSA checks UE registration and auto-registers the UE if it is not already registered. At 608, the SSA checks if the QoS link (primary PDP context) is established, and if not, automatically activates the context process to create a network interfaces and associated distinct IP address assigned by the network. At 610, the SSA manages admission by checking for resource exhaustion and redirecting applications to the available resource.

Figure 7:
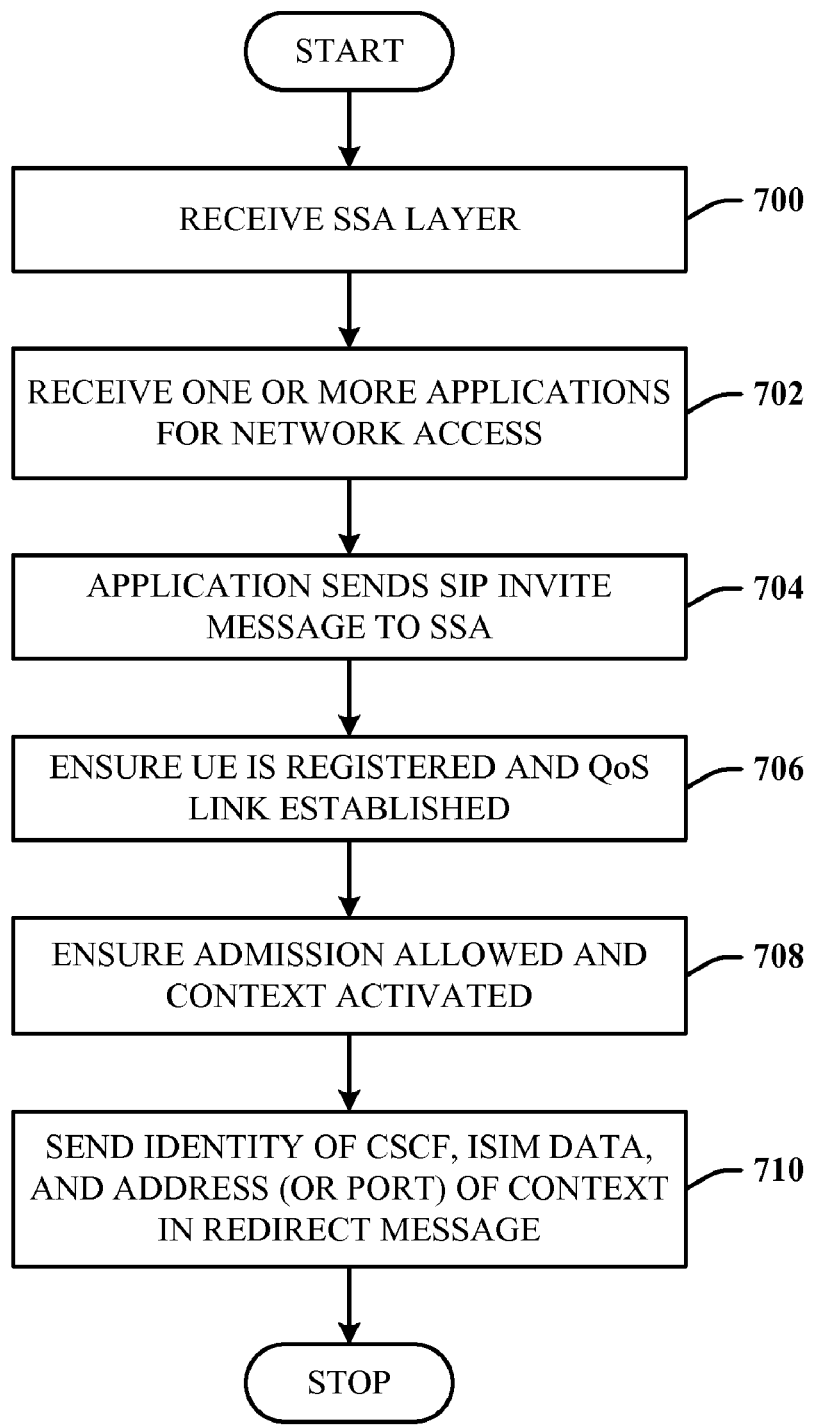
FIG. 7 illustrates a methodology of discovering ISIM profiles.

FIG. 7 illustrates a methodology of discovering ISIM profiles. At 700, the SSA layer architecture is received. At 702, one or more applications are available on the computer for accessing network services and data. At 704, an application sends a SIP invite message to the SSA. At 706, the SSA ensures the UE is registered and the QoS link (primary PDP context) is established. At 708, the SSA ensures that admission is allowed and context activated. At 710, the SSA sends the identity of the CSCF (call session control function), ISIM data, and address (and/or port number) of context in a redirect message.

Figure 8A:
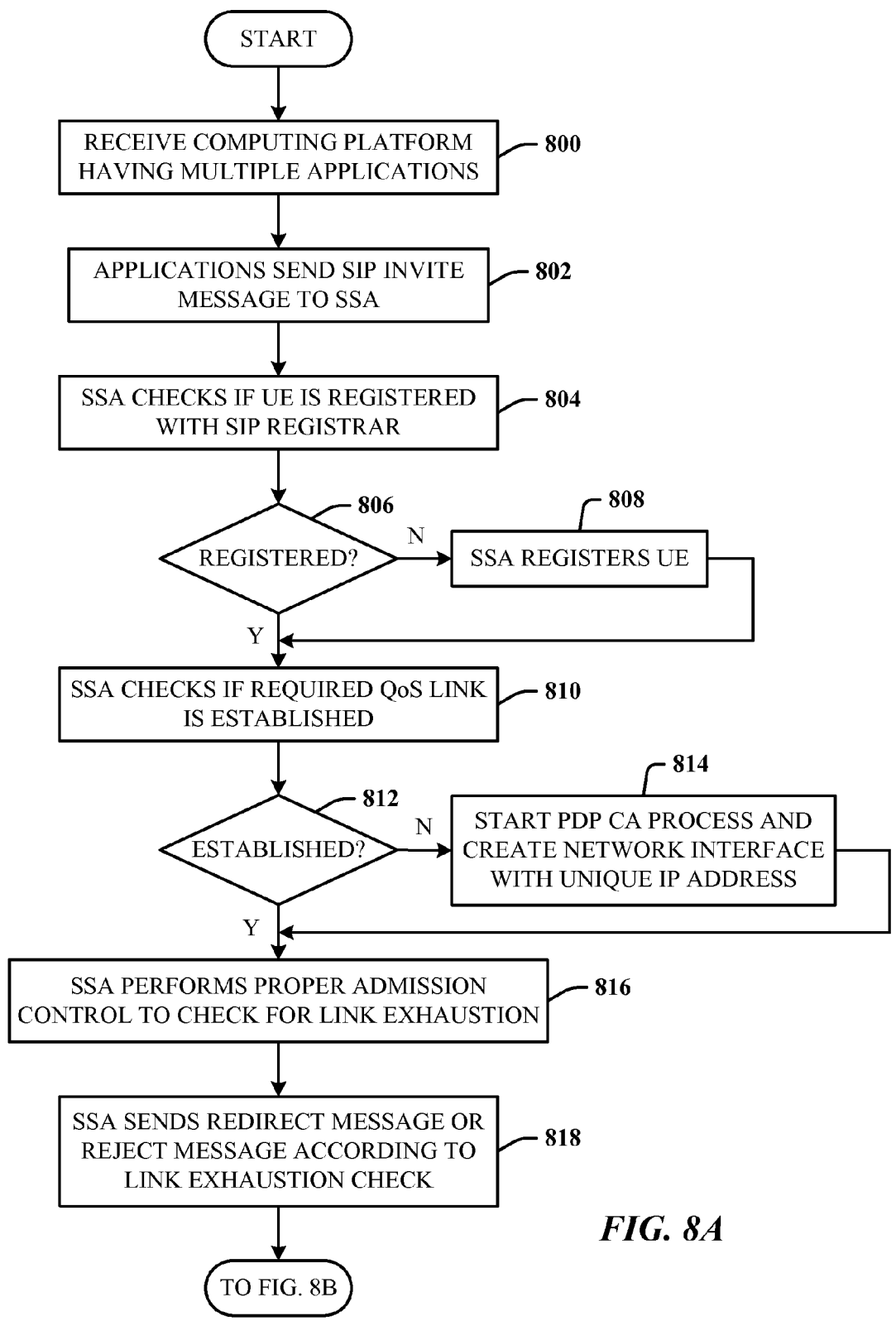
FIG. 8A and FIG. 8B illustrate a methodology of providing session-independent QoS channels for multimedia services in accordance with the invention.
Figure 8B:
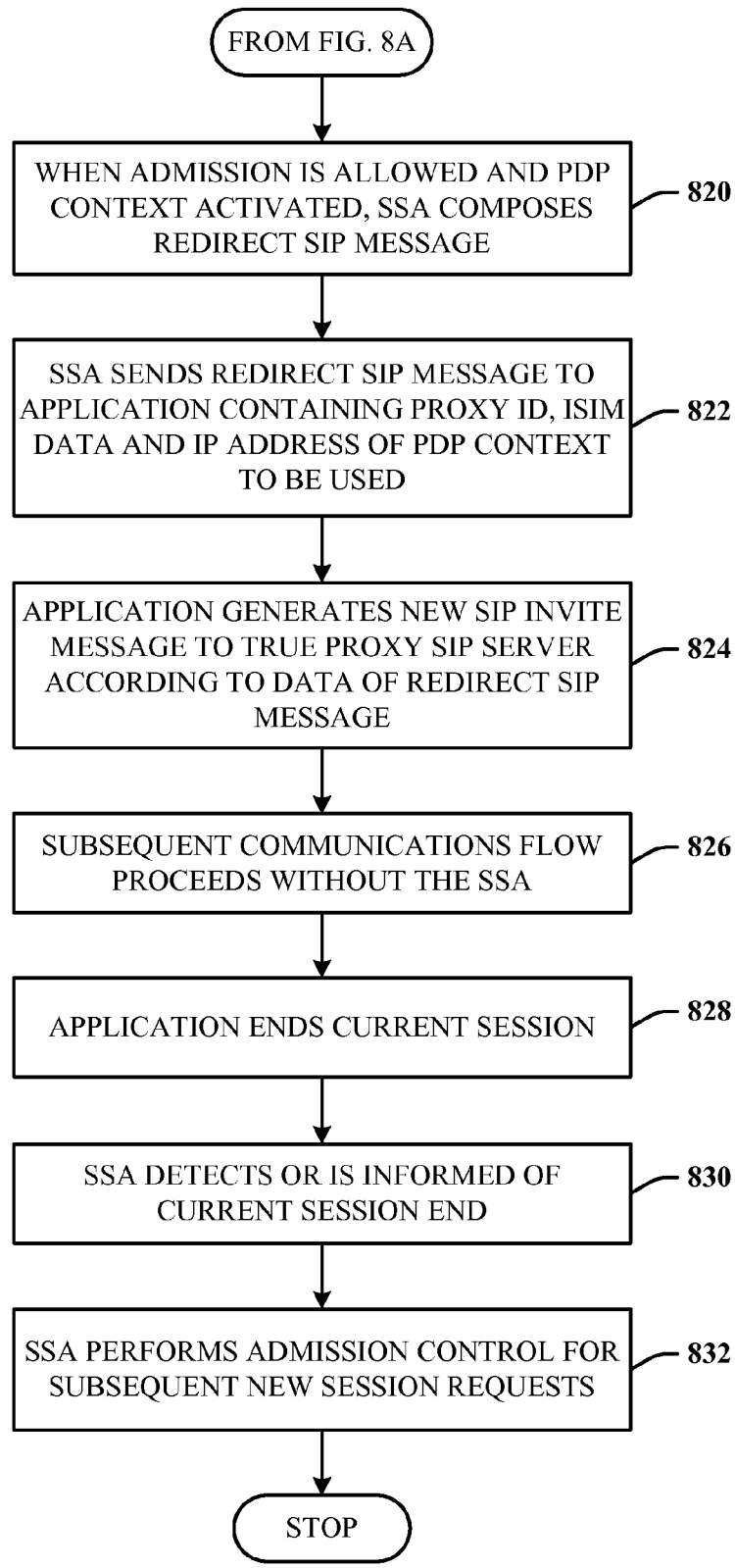

FIG. 8A and FIG. 8B illustrate a methodology of providing session-independent QoS channels for multimedia services in accordance with the invention. Referring now to FIG. 8A, at 800, a computing system is received that includes one or more applications. At 802, all applications initially will send an SIP Invite message to the applications component, also referred to hereinafter as the SIP Service Activation (SSA) abstraction layer. At 804, the SSA will check if the UE (user equipment), which includes the data card, has been registered with a SIP registrar. At 806, if not, flow proceeds to 808 where the SSA performs registration of the UE on its behalf. At 806, if the UE is registered, progress is to 810 where the SSA checks if the required QoS link (primary PDP context associated with an APN) has been established. At 812, if the link is not established, flow is to 814 where the SSA will start the PDP context activation process and create an associated network interface (with a distinct IP address assigned by the network). If the link is established, flow is from 812 to 816, where the SSA performs proper admission control to check if the resource associated with the link has been exhausted by other applications. At 818, the SSA then sends a redirect message or a reject message.

Continuing on to FIG. 8B, at 820, when admission is allowed and the PDP context has been activated, SSA composes a redirect SIP message. At 822, the SSA sends the redirect SIP message to the application. The redirect message can include the identity of the P-CSCF (proxy-call session control function), other relevant ISIM information, and the IP address (network interface) of the PDP context it should use in sending the subsequent SIP and RTP (realtime transport protocol) packets.

The CSCF provides session control for subscribers accessing services within the IM (IP multimedia) core network. In essence the CSCF is a SIP Server whose responsibility is interacting with network databases such as a home subscriber server (HSS) for mobility and AAA (access, authorization and accounting) Servers for security. The P-CSCF is an IMS element that is identified as the mobile device's first contact point within the IM core network subsystem. Functions of the P-CSCF include the forwarding of SIP messages received from the UE, which can be sent to an interrogating CSCF (or I-CSCF) or a serving CSCF (or S-CSCF), depending on the type of message and procedure being carried out. The P-CSCF is also responsible for the generation of a CDR (call detail record).

IMS subscribers may be issued with an ISIM for the operator or carrier supporting the IMS service. This is similar in nature to the SIM (subscriber identity module) used in GSM and GPRS and the USIM (universal SIM) employed in UMTS. It holds files regarding a user subscription level, as well as authentication, security information and the user's IMS private identity held in the form of an NAI (network access identifier). Note that if the subscriber does not have an ISIM, then the USIM may be employed, as the security algorithms held on the USIM can be the same as those held on the ISIM. An IMS private identity, however, will have to be resolved from the user's IMSI (international mobile subscriber identity).

Once the SIP redirect message is received, the application can generate a new SIP invite message destined to the true proxy SIP server on the network, as indicated at 824. At 826, subsequent flow will continue without the involvement of SSA. At 828, when the application ends the current session (via a SIP BYE message, for example), the SSA will be informed (implementation dependent) or detects the availability of the resource, as indicated at 830. At 832, the SSA performs proper admission control for subsequent new session requests.

Applications can start with an SSA address/port (127.0.01: 5060) when initiating a new session in order to obtain proxy ID, interface IP address to use, and to receive proper admission control.

Figure 9:
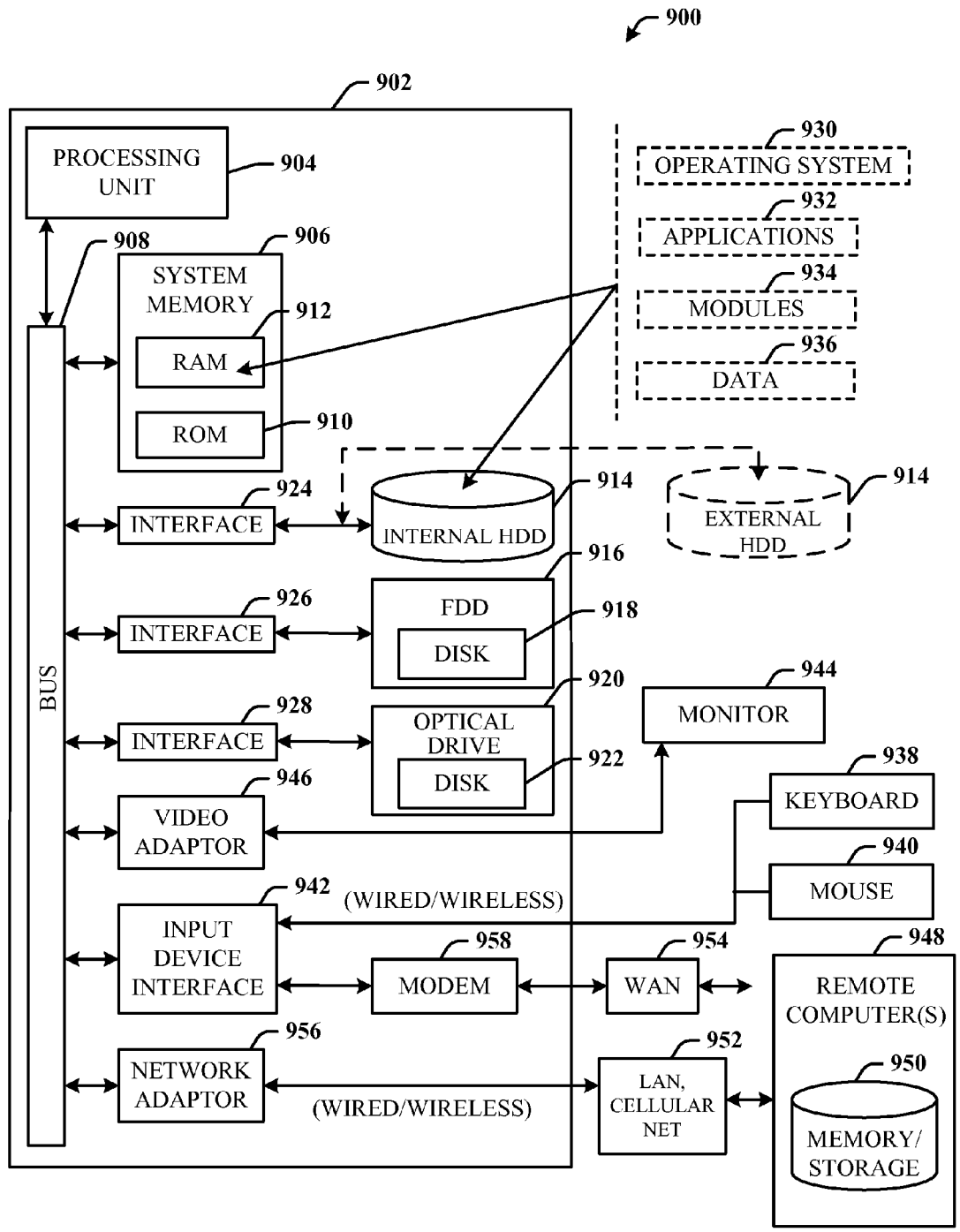
FIG. 9 illustrates a block diagram of a computer operable to execute the disclosed SSA architecture.

Referring now to FIG. 9, there is illustrated a block diagram of a computer operable to execute the disclosed SSA architecture. In order to provide additional context for various aspects of the subject invention, FIG. 9 and the following discussion are intended to provide a brief, general description of a suitable computing environment 900 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the invention includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN or cellular network 952, which may also include a wireless access point disposed thereon for communicating with the wireless adaptor 956. The adaptor 956 can also include a PC card (or data card) that facilitates connection to the cellular network 952 (e.g., 2G, 3G, 4G, . . . ) via which IP data and services can be accessed. In accordance with the subject invention, the applications 932 interface with the SSA, which can be included as a software module of the modules 934, in the ROM 910, and/or part of the operating system 930, for example.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
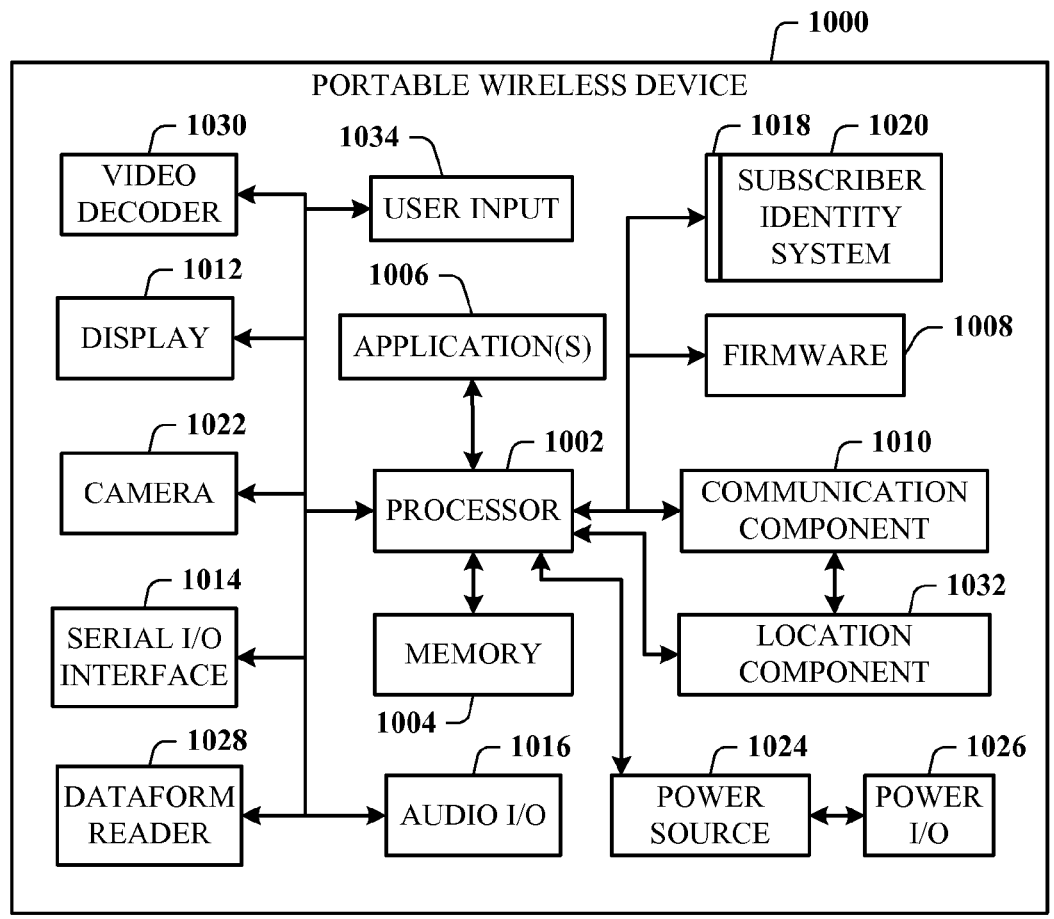
FIG. 10 illustrates a block diagram of the portable wireless device operable to benefit from the architecture of the subject invention.

Referring now to FIG. 10, there is illustrated a block diagram of the portable wireless device (PWD) 1000 operable to benefit from the architecture of the subject invention. The PWD 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signal. The applications 1006 can be stored in the memory 1004 and/or in a firmware 1008, and executed by the processor 1002 from either or both the memory 1004 or/and the firmware 1008. Here, the application(s) 1006 can include the SSA and SAP architecture of the subject invention. The firmware 1008 can also store startup code for execution in initializing the PWD 1000, as well as the SSA/SAP architecture, according to a particular implementation. A communication component 1010 interfaces to the processor 1002 to facilitate wired/wireless communication with external systems, e.g., cellular networks, VoIP networks, and so on. The communications component 1010 includes similar capabilities of the data card 408 of FIG. 4 such that concurrent sessions and contexts for QoS requirements described supra can be realized. The PWD 1000 includes devices such as a cellular telephone, a PDA with mobile communications capabilities, and messaging-centric devices.

The PWD 1000 includes a display 1012 for displaying text, images, video, telephony functions (e.g., a Caller ID function), setup functions, and for user input. The display 1012 can also accommodate the presentation of multimedia content. A serial I/O interface 1014 is provided in communication with the processor 1002 to facilitate serial communication (e.g., USB, and/or IEEE 1394) via a hardwire connection, and other serial input devices (e.g., a keyboard, keypad, and mouse). This supports updating and troubleshooting the PWD 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals via a microphone to record data and/or telephony voice data, and for inputting voice signals for telephone conversations.

The PWD 1000 includes a slot interface 1018 for accommodating a SIC (Subscriber Identity Component) in the form factor of a card Subscriber Identity Module (SIM) 1020, and interfacing the SIM card 1020 with the processor 1002. However, it is to be appreciated that the SIM card 1020 can be manufactured into the PWD 1000, and updated by downloading data and software thereinto.

The PWD 1000 can process IP data traffic via the communication component 1010 to accommodate IP traffic from an IP network such as, for example, the Internet, a corporate intranet, a home network, a person area network, etc., via an ISP or cable provider. Thus, VoIP traffic can be utilized by the PWD 1000, and IP-based multimedia content can be received in either an encoded or a decoded format.

A video processing component 1022 (e.g., a camera) can be provided for decoding encoded multimedia content. The PWD 1000 also includes a power source 1024 in the form of batteries and/or an AC power subsystem, which power source 1024 interfaces to an external power system or charging equipment (not shown) via a power I/O component 1026.

The PWD 1000 can also include a dataform reader 1028 suitably designed to read many types of dataforms. For example, the reader 1028 can scan product bar codes of two and three dimensions, and other types of indicia.

The PWD 1000 can also include a video decoder component 1030 for processing video content received and transmitted. A location tracking component 1032 facilitates geographically locating the PWD 1000. As described hereinabove, this can occur when the user initiates the feedback signal automatically or manually.

A user input component 1034 can include such conventional input device technologies such as a keypad, keyboard, mouse, stylus pen, and touch screen, for example.

Figure 11:
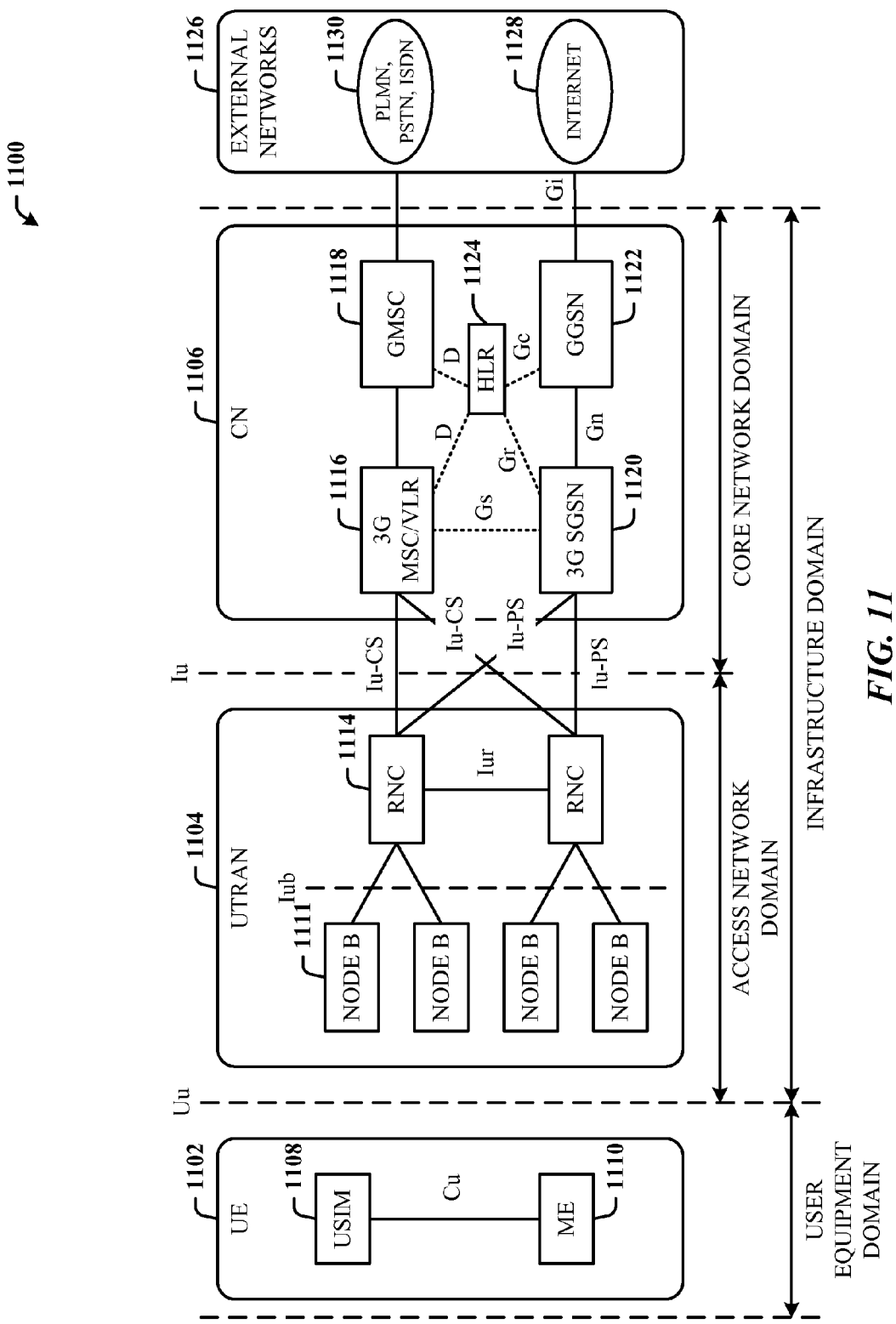
FIG. 11 illustrates an exemplary UMTS network that facilitates SSA processing in accordance with the subject innovation.

FIG. 11 illustrates an exemplary UMTS network 1100 that facilitates SSA processing in accordance with the subject innovation. The architecture is based on the 3GPP (Third Generation Partnership Project) Release 99 specification. However, it is to be understood that the subject innovation can be applied to any UMTS telecommunications architecture, including by way of example, Release 5 (R5) and, R5 and Release 6 (R6) 3GPP standards. UMTS offers teleservices (e.g., speech and/or SMS-Short Message Service) and bearer services, which provide the capability for information transfer between access points. Negotiation and renegotiation of the characteristics of a bearer service can be performed at session or connection establishment, and during an ongoing session or connection. Both connection oriented and connectionless services can be offered for point-to-point and point-to-multipoint communications.

The following frequencies 1885-2025 MHz and 2110-2200 MHz can be allocated for UMTS use. However, the innovative aspects described herein can also be applied to other frequency bands. Bearer services can have different QoS (quality-of-service) parameters for maximum transfer delay, delay variation and bit error rate. Offered data rate targets are: 144 kbps satellite and rural outdoor; 384 kbps urban outdoor; and 2048 kbps indoor and low range outdoor.

UMTS network services can have different QoS classes for four types of traffic: conversational class (e.g., voice, video telephony, video gaming); streaming class (e.g., multimedia, video on demand, webcast); interactive class (e.g., web browsing, network gaming, database access); and background class (e.g., email, SMS, downloading).

UMTS can also support have a virtual home environment, which is a concept for portability across network boundaries and between terminals in a personal service environment. Personal service environment means that users are consistently presented with the same personalized features, user interface customization and services in whatever network or terminal, wherever the user may be located. UMTS also includes network security and location based services.

The UMTS network 1100 can consist of three interacting domains; a user equipment (UE) domain 1102, a UMTS Terrestrial Radio Access Network (UTRAN) domain 1104, and a core network (CN) domain 1106. The UTRAN domain 1104 is also referred to as the access network domain and the CN 1106 is referred to as the core network domain, the both of which comprise an infrastructure domain.

The UE domain 1102 includes a USIM (user services identity module) domain and an ME (mobile equipment) domain. User equipment is the equipment used by the user to access UMTS services. In the UE domain 1102, the UMTS IC card is the USIM 1108 which has the same physical characteristics as GSM SIM (subscriber identity module) card. The USIM interfaces to ME 1110 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications.

UE terminals work as an air interface counter part for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 1104 provides the air interface access method for the UE domain 1102. The reference point between the UE domain and the infrastructure domain is the Uu UMTS radio interface. The access network domain provides the physical entities that manage resources of the access network and facilitates access to the core network domain. In UMTS terminology, a base station of the access network domain is referred as a Node-B device 1112, and control equipment for Node-B devices is called a radio network controller (RNC) 1114. The interface between the Node-B device and the RNC 1114 is the Iub interface. The interface between two RNCs is called the Iur interface.

The functions of Node-B devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control.

Wideband CDMA (WCDMA) technology was selected for UTRAN air interface. UMTS WCDMA is a direct sequence CDMA system where user data is multiplied with quasi-random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network is divided in circuit-switched and packet-switched domains. Some of the circuit-switched elements are a mobile services switching center (MSC) and visitor location register (VLR) 1116 and gateway MSC (GMSC) 1118. Packet-switched elements include a serving GPRS support node (SGSN) 1120 and gateway GPRS support node (GGSN) 1122. Some network elements such as an EIR (equipment identity register) (not shown), HLR (home location register) 1124, VLR and AuC (authentication center) (not shown) can be shared by both domains.

A function of the CN 1102 is to provide switching, routing and transit for user traffic. The CN 1102 also contains the databases and network management functions. The basic CN architecture for UMTS is based on the GSM network with GPRS (general packet radio service) capability. All equipment is modified for UMTS operation and services. The radio access network has several interfaces which can be configured and dimensioned. The CN 1106 interfaces to the radio access domain via an Iu interface. An Iu-CS (circuit-switched) reference point interfaces an RNC of the access network to the MSC/VLR entity 1116 of the CN 1106 for voice from/to the MSC/VLR 1116. An Iu-PS (packet-switched) reference point interfaces an RNC of the access network to the SGSN entity 1120 of the CN 1106 for data from/to the SGSN 1120.

In the CN 1106, a Gs interface is provided between the MSC/VLR 1116 and the SGSN. A Gn interface is provided between the SGSN 1120 and the GGSN 1122. A D interface is provided between the MSC/VLR 1116 and the HLR 1124, and the HLR 1124 and the GMSC 1118. A Gr interface is provided between the SGSN 1120 and the HLR 1124. A Gc interface is provided between the GGSN 1122 and the HLR 1124.

The CN 1106 provides the interface from the UE domain 1102 to external networks 1126 such as the Internet 1128 via a Gi interface from the GGSN 1122, and other networks 1130 via the GMSC 1118, which can include a PLMN (public land mobile network), PSTN (public switched telephone network) and ISDN (integrated service digital network) networks.

Asynchronous Transfer Mode (ATM) is defined for UMTS core transmission. ATM Adaptation Layer type 2 (AAL2) handles circuit-switched connection, and packet connection protocol AAL5 is designed for data delivery.

The architecture of the CN 1106 can change when new services and features are introduced. Number Portability Database (NPDB), for example, can be used to enable a user to change the network while keeping their old phone number. A gateway location register (GLR) can be employed to optimize the subscriber handling between network boundaries. Additionally, the MSC/VLR and SGSN can merge to become a UMTS MSC.

Summarizing the UMTS frequencies, 1920-1980 MHz and 2110-2170 MHz are employed for FDD and WCDMA. Paired uplink and downlink channel spacing can be 5 MHz and raster is 200 kHz. An operator can use 3-4 channels (2×15 MHz or 2×20 MHz) to build a high-speed, high-capacity network. Frequencies 1900-1920 MHz and 2010-2025 MHz are for TDD and TD/CDMA. Unpaired channel spacing can be 5 MHz and raster is 200 kHz. Transmit and receive are not separated in frequency. Frequencies 1980-2010 MHz and 2170-2200 MHz are employed for satellite uplink and downlink.

The disclosed invention finds application to EDGE (Enhanced Data rates for GSM Evolution) technology. EDGE is effectively the final stage in the evolution of the GSM standard, and uses a new modulation schema to enable theoretical data speeds of up to 384 Kbps within the existing GSM spectrum. EDGE is an alternative upgrade path towards 3G services for operators, without access to a new spectrum.

The architecture of the invention also finds application to a hierarchical cell structure (HCS). HCS is the architecture of a multi-layered cellular network where subscribers are handed over from a macrocell to a microcell, and even further, to a picocell, depending on the current network capacity and the needs of the subscriber.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory;
at least one processor communicatively coupled to the memory that facilitates execution of computer instructions at least to:
route messages from network applications and verify that user equipment associated with the messages is routable via a quality of service link;
redirect the network applications to a network resource in response to a determined state of the network resource and connect the network applications to the network resource via a wireless network;
disable the network resource in response to the network resource no longer being requested and terminate access of at least one network application of the network applications to the network resource independent of a termination of a concurrent network session; and
function as a user agent server to facilitate management of quality of service connectivity between the at least one network application and the network resource, wherein the user agent server is accessible to another network application other than the at least one network application after the quality of service connectivity is established.

2. The system of claim 1, wherein the network applications are redirected via a network divided into circuit-switched and packet-switched domains.

3. The system of claim 1, comprising at least one of a serving general packet radio service support node or a gateway general packet radio service support node.

4. The system of claim 3, further comprising at least one of an equipment identity register, a home location register, or an authentication center.

5. The system of claim 1, further comprising a radio access network configured to provide resource point interfaces.

6. The system of claim 5, wherein the at least one processor further facilitates the execution of a computer instruction at least to enable a change of networks while retaining a previous contact number.

7. The system of claim 6, wherein the at least one processor further facilitates the execution of a computer instruction at least to optimize a subscriber process between network boundaries.

8. The system of claim 1, wherein the at least one processor further facilitates the execution of a computer instruction at least to perform admission control by issuance of a reject message to the at least one network application in response to a determination that the network resource is exhausted.

9. The system of claim 1, wherein the at least one processor further facilitates the execution of a computer instruction at least to perform admission control by issuance of a redirect message to direct at least one other network application to the network resource in response to a determination that the network resource is not exhausted.

10. A method, comprising:
routing messages from network applications, by a system including at least one processor, and verifying that user equipment associated with the messages is routable via a quality of service link;
redirecting the network applications to a network resource in response to a determined state of the network resource;
connecting the network applications to the network resource via a wireless network;
disabling the network resource in response to the network resource not being requested and terminating access of at least one network application of the network applications to the network resource independent of a termination of a concurrent network session; and
managing quality of service connectivity between the at least one network application and the network resource and exposing a server to another network application other than the at least one network application in response to the quality of service connectivity being established.

11. The method of claim 10, further comprising communicating via a network split into circuit-switched domains and packet-switched domains.

12. The method of claim 10, wherein the connecting the network applications further comprises connecting the network applications over at least one of a general packet radio service support node or a gateway general packet radio service support node.

13. The method of claim 10, wherein the connecting the network applications further comprises utilizing resource point interfaces.

14. The method of claim 13, further comprising changing networks and retaining a previous contact number using a number portability database.

15. The method of claim 14, further comprising optimizing a subscriber process between network boundaries using a gateway location register.

16. The method of claim 10, further comprising checking network resources, and in response to the network resources having been exhausted, issuing a reject message to the at least one network application.

17. The method of claim 10, further comprising checking network resources, and in response to the network resources not being exhausted, issuing a redirect message to direct at least one other network application to the network resource.

18. The method of claim 10, further comprising automatically registering the user equipment.

19. A non-transitory computer readable storage medium comprising computer executable instructions that in response to execution, cause a system including at least one processor to perform operations, comprising:

routing messages from network applications, and verifying that user equipment associated with the messages is routable via a quality of service link;

redirecting the network applications to a network resource in response to a determined state of the network resource;

connecting the network applications to the network resource via a wireless network;

disabling the network resource in response to the network resource not being required;

terminating access of at least one network application of the network applications to the network resource independent of a termination of a concurrent network session; and managing quality of service connectivity between the at least one network application and the network resource and exposing a server to another network application other than the at least one network application in response to the quality of service connectivity being established.

* * * * *